(12) United States Patent
Lai

(10) Patent No.: US 8,783,420 B2
(45) Date of Patent: Jul. 22, 2014

(54) LUGGAGE BRAKE DEVICE

(76) Inventor: Wei Hung Lai, Taichung (TW)

( * ) Notice: Subject to any disclaimer, the term of this patent is extended or adjusted under 35 U.S.C. 154(b) by 39 days.

(21) Appl. No.: 13/539,742

(22) Filed: Jul. 2, 2012

(65) Prior Publication Data

US 2014/0000989 A1    Jan. 2, 2014

(51) Int. Cl.
*B60B 33/00*    (2006.01)
(52) U.S. Cl.
USPC ............................................. 188/69; 188/1.12
(58) Field of Classification Search
USPC ................ 188/69, 265, 1.12, 31, 2 D, 19, 20; 190/18 A; 16/35 R
See application file for complete search history.

(56) References Cited

U.S. PATENT DOCUMENTS

2012/0160617 A1*    6/2012 Qi et al. ................... 188/1.12
2012/0311821 A1*    12/2012 Eguchi ...................... 16/35 R

* cited by examiner

*Primary Examiner* — Bradley King
*Assistant Examiner* — Vu Q Nguyen
(74) *Attorney, Agent, or Firm* — Banger Shia

(57) ABSTRACT

A luggage brake device includes a wheel and a control unit. The wheel includes positioning teeth, an engaging member, engaging teeth, a link axle, a link plate, a control wire. The control unit is disposed on a luggage body. The control unit includes a knob, a press button, a gear, a release block and a driving block connected with the control wire. Through the knob, the press button and the driving block of the control unit, the control wire is activated to link the engaging member with the engaging teeth to engage with the positioning teeth of the wheel so that the wheel is positioned. The present invention can be operated conveniently.

1 Claim, 4 Drawing Sheets

LUGGAGE BRAKE DEVICE

BACKGROUND OF THE INVENTION

1. Field of the Invention

The present invention relates to a luggage brake device, and more particularly, to a brake device to position or release a wheel of a luggage by operating a knob and a press button manually. The present invention can be used conveniently.

2. Description of the Prior Art

Most luggage wheels are not provided with a brake device, having a problem of unsuitable rolling. A conventional luggage with a wheel brake is developed. The wheel is provided with a brake pressed by foot and a brake handle pulled by hand to release the brake. When the user wants to release the brake, he/she has to bend down to operate the wheel manually. It is not convenient for use, in particular, to the elder or at a crowded place.

Accordingly, the present invention intends to provide a luggage brake device for improving the shortcomings mentioned above.

SUMMARY OF THE INVENTION

The primary object of the present invention is to provide a luggage brake device which can be operated conveniently. The luggage brake device comprises a wheel and a control unit. The wheel comprises positioning teeth, an engaging member, engaging teeth, a link axle, a link plate, a control wire. The control unit is disposed on a luggage body. The control unit comprises a knob, a press button, a gear, and a driving block connected with the control wire. The knob of the control unit of the luggage body is rotated to control engagement of the engaging teeth of the engaging member and the positioning teeth of the wheel. The press button is pressed to release the engagement. The present invention can be used conveniently and quickly.

DETAILED DESCRIPTION OF THE PREFERRED EMBODIMENTS

Figure 1:
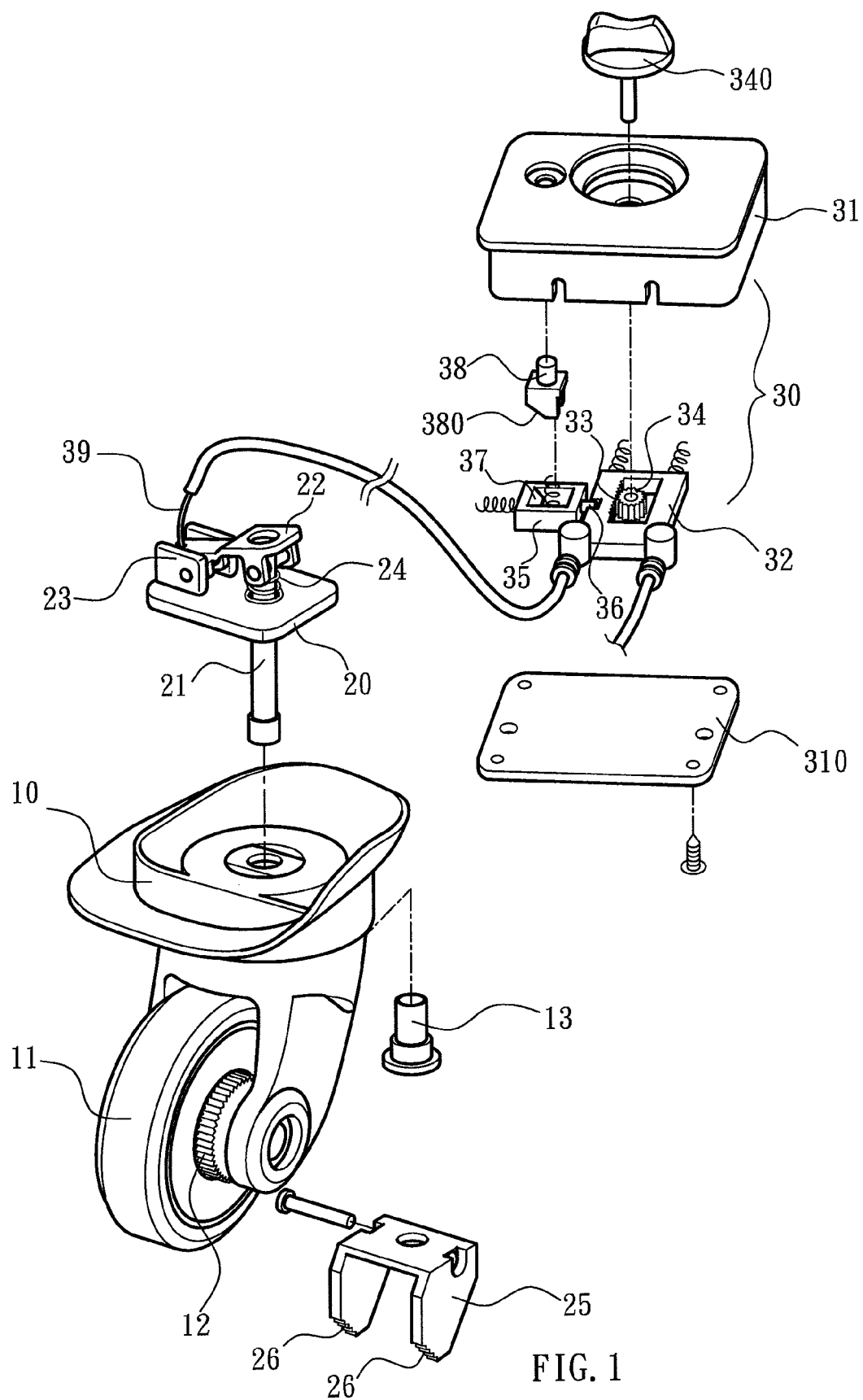
FIG. 1 is an exploded view according to a preferred embodiment of the present invention.

Embodiments of the present invention will now be described, by way of example only, with reference to the accompanying drawings.

As shown in FIG. 1 to FIG. 5, the luggage brake device according to a preferred embodiment of the present invention comprises a wheel seat 10 with a wheel 11, a fixing plate 20 and a control unit 30. The wheel 11 of the wheel seat 10 is provided with positioning teeth 12. The wheel seat 11 comprises an axle sleeve 13. The fixing plate 20 comprises a link axle 21 extending through the wheel seat 10. An engaging member 25 is provided at a lower end of the link axle 21. The engaging member 25 has engaging teeth 26 corresponding to the positioning teeth 12 of the wheel 11. The fixing plate 20 comprises a pivot seat 23 connected with a link plate 22 which can be tilted, a spring 24 under the link plate 22 and a control wire 39. The control unit 30 is disposed on a luggage body 14. The control unit 30 comprises a box 31. The box 31 comprises a knob 340 and a press button 38. The box 31 further comprises a driving block 32 therein. The driving block 32 has a gear rack 33 and a gear 34. The gear 34 is connected with the knob 340 and meshes with the gear rack 33. The driving block 32 is connected with the control wire 39. A release block 35 is provided at one side of the driving block 32. The release block 35 has an inclined surface 37 therein. The release block 35 has a protruding post 36 to connect with the driving block 32. The press button 38 is disposed above the release block 35 and has an inclined surface 380. When the press button 38 is pressed, the release block 35 will be released. A lid 310 is provided to cover the box 31, so that the release block 35 and the driving block 32 are received in the box 31.

Figure 2:
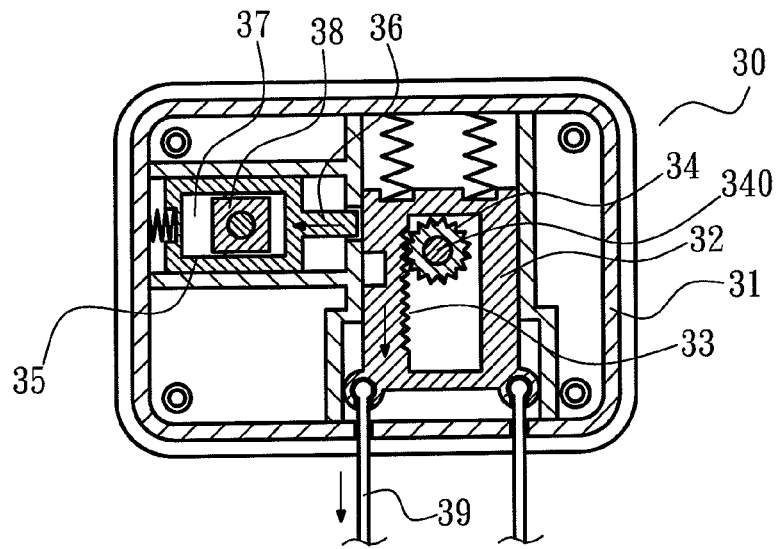
FIG. 2 is a sectional view showing the control unit when the wheel is released according to the preferred embodiment of the present invention.
Figure 3:
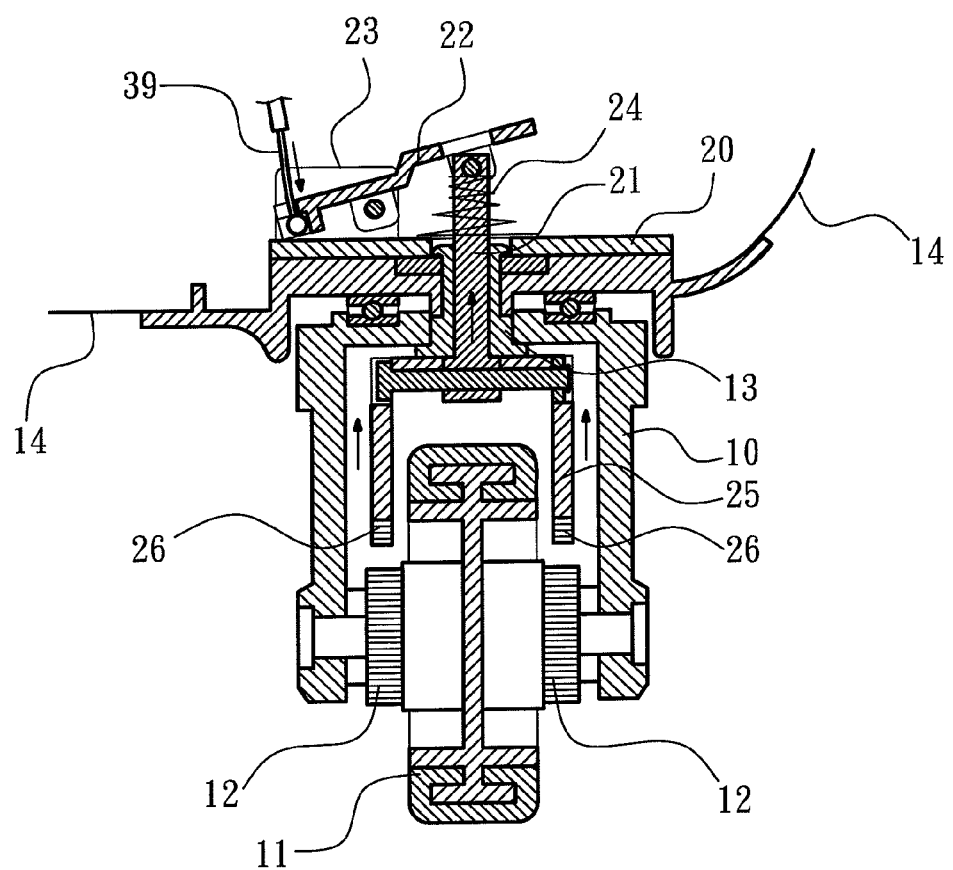
FIG. 3 is a sectional view showing the released wheel according to the preferred embodiment of the present invention.
Figure 4:
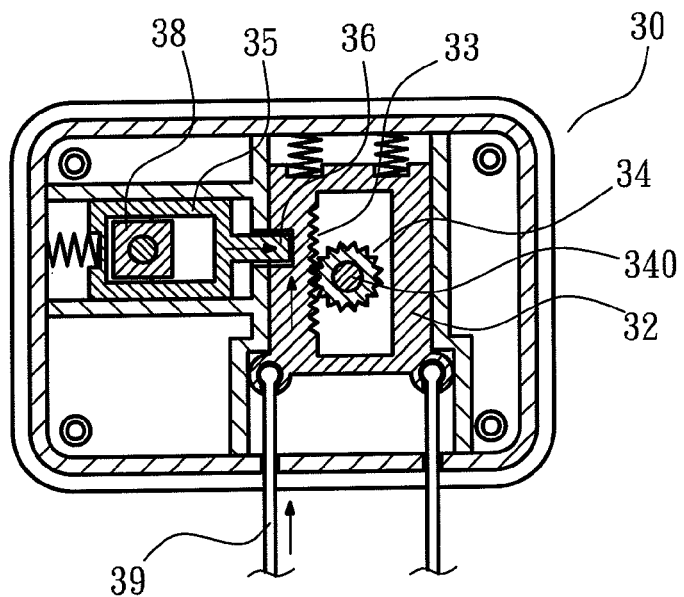
FIG. 4 is a sectional view showing the control unit when the wheel is positioned according to the preferred embodiment of the present invention.
Figure 5:
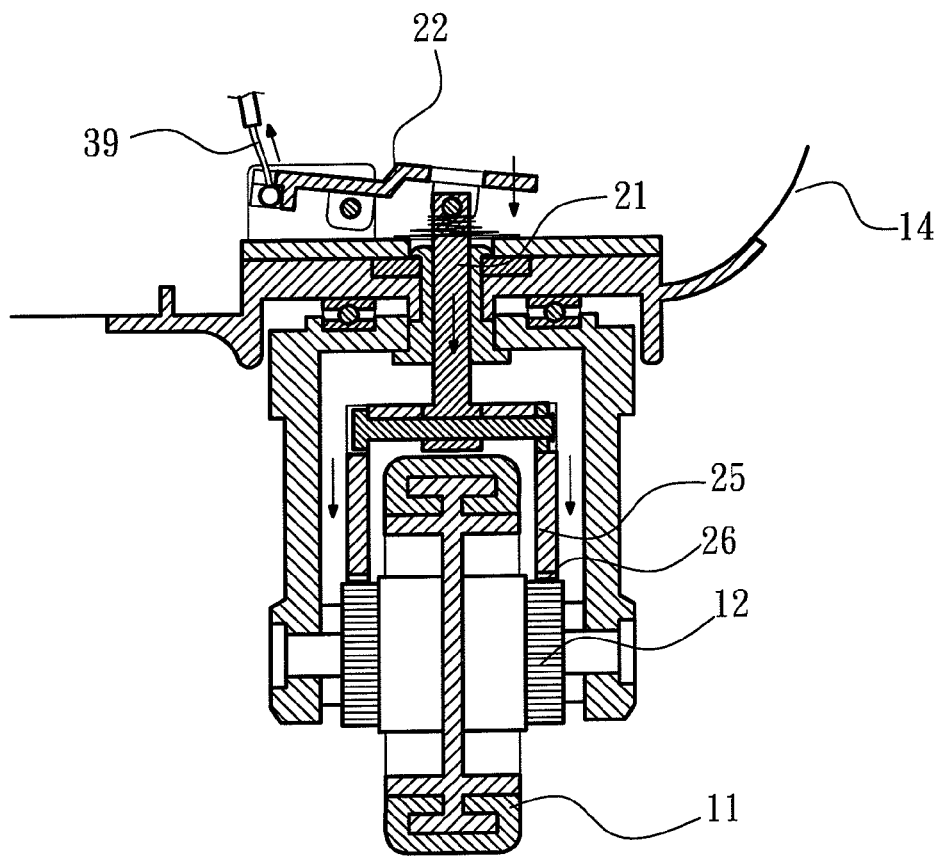
FIG. 5 is a sectional view showing the positioned wheel according to the preferred embodiment of the present invention.

FIG. 2 and FIG. 3 show the wheel 11 is in a release state. The driving block 32 is at the front position and the control wire 39 is not in a tightened state. The link axle 21 biased by the spring 24 is in an upward state. The engaging teeth 26 of the engaging member 25 disengage from the positioning teeth 12 of the wheel 11 so that the wheel 11 can roll. When the user wants to brake the wheel 11, as shown in FIG. 4 and FIG. 5, the knob 340 is rotated to turn the gear 34. The gear 34 brings the gear rack 33 to move the driving block 32 backward, such that the control line 39 is tightened and the link plate 22 is moved downward. The link axle 21 and the engaging member 25 are moved downward and the engaging teeth 26 engage with the positioning teeth 12 of the wheel 11 so that the wheel 11 won't roll. When the user wants to release the brake, as shown in FIG. 2 and FIG. 3, the press button 38 is pressed. The inclined surface 380 of the press button 38 is against the inclined surface 37 of the release block 35 to move the release block 35 backward. The protruding post 36 is retracted, not blocking the driving block 32. The driving block 32 cooperates with the elasticity of the spring to loosen the control wire 39. The link plate 22 doesn't press the link axle 21 anymore, so the engaging teeth 26 of the engaging member 25 disengage from the positioning teeth 12 of the wheel 11.

Figure 6:
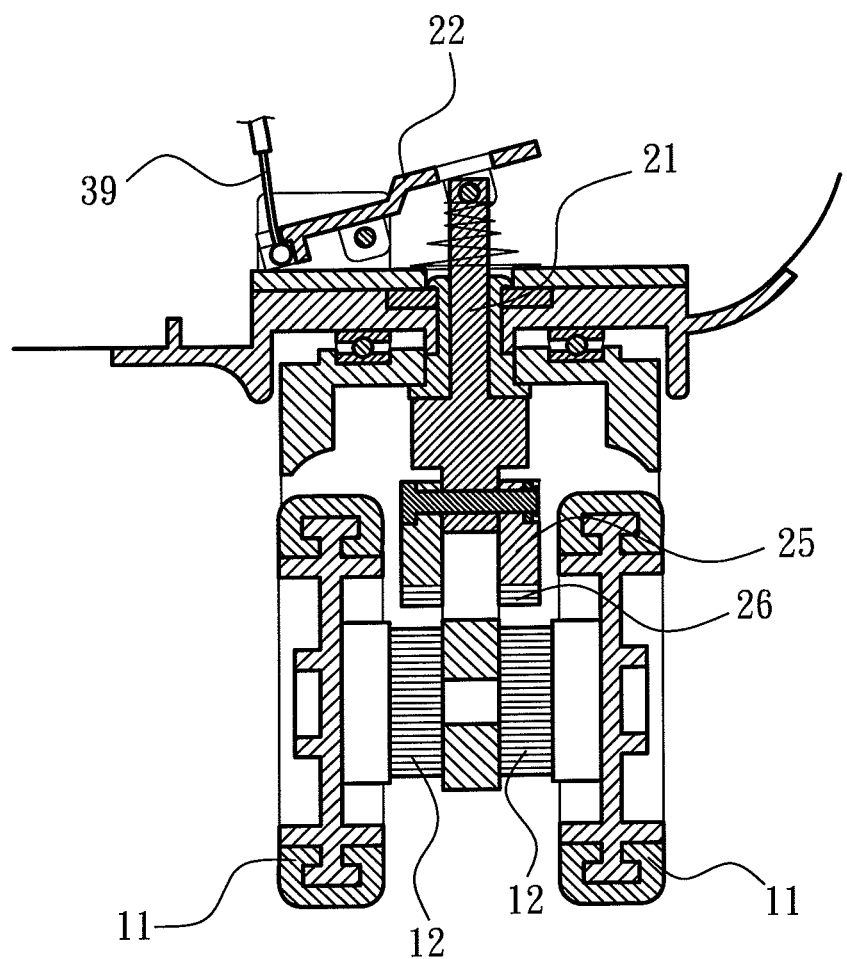
FIG. 6 is a sectional view showing another embodiment of the present invention.

Accordingly, the user just operates the knob 340 and the press button 38 of the present invention to position or release the wheel, without bending down for operation. The present invention can be used easily, conveniently and quickly. The present invention can applied to a dual-wheel structure. As shown in FIG. 6, the positioning teeth 12 are disposed between two wheels 11 for engagement of the engaging teeth of the engaging member 25.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A luggage brake device, comprising a wheel seat with a wheel, a fixing plate coupled to the wheel seat, and a control unit, the wheel of the wheel seat being provided with positioning teeth, the fixing plate comprising a link axle extending through the wheel seat, an engaging member provided at a lower end of the link axle, the engaging member having engaging teeth corresponding to the positioning teeth of the wheel, the fixing plate comprising a pivot seat connected with a link plate, a spring under the link plate, and a control wire, the control unit being disposed on a luggage body, the control unit comprising a knob and a press button, the knob being connected with the control wire, rotating the knob can make the control wire pull the link plate, the link axle, and the engaging member downward until the engaging teeth engage with the positioning teeth of the wheel, so as to stop the wheel from rotating, pressing the press button can loosen the control wire, so that the engaging teeth of the engaging member is pushed to disengage from the positioning teeth of the wheel, and as a result, the wheel is free to roll.

* * * * *